United States Patent
Latapie et al.

(10) Patent No.: US 10,740,675 B2
(45) Date of Patent: Aug. 11, 2020

(54) SCALABLE DEEP LEARNING VIDEO ANALYTICS

(71) Applicant: Cisco Technology, Inc., San Jose, CA (US)

(72) Inventors: Hugo Mike Latapie, Long Beach, CA (US); Enzo Fenoglio, Issy-les-Moulineaux (FR); Joseph T. Friel, Ardmore, PA (US); Andre Surcouf, Saint-Leu-la-Foret (FR); Pascal Thubert, La-Colle-sur-Loup (FR)

(73) Assignee: Cisco Technology, Inc., San Jose, CA (US)

( * ) Notice: Subject to any disclaimer, the term of this patent is extended or adjusted under 35 U.S.C. 154(b) by 26 days.

(21) Appl. No.: 16/151,783

(22) Filed: Oct. 4, 2018

(65) Prior Publication Data

US 2019/0034799 A1    Jan. 31, 2019

Related U.S. Application Data

(62) Division of application No. 15/374,571, filed on Dec. 9, 2016, now Pat. No. 10,121,103.

(51) Int. Cl.
*G06N 3/08* (2006.01)
*G06T 7/246* (2017.01)
(Continued)

(52) U.S. Cl.
CPC ........... *G06N 3/08* (2013.01); *G06K 9/00771* (2013.01); *G06K 9/6232* (2013.01);
(Continued)

(58) Field of Classification Search
CPC ...... G06N 3/08; G06N 3/0472; G06N 3/0454; G06T 7/246; G06T 2207/20084;
(Continued)

(56) References Cited

U.S. PATENT DOCUMENTS

| 5,247,584 A | * | 9/1993 | Krogmann | ............... G01S 7/417 |
|---|---|---|---|---|
| | | | | 382/107 |
| 6,115,052 A | * | 9/2000 | Freeman | ................. G06T 13/40 |
| | | | | 345/419 |

(Continued)

OTHER PUBLICATIONS

Arel, et al., "DeSTIN: A Scalable Deep Learning Architecture with Application to High-Dimensional Robust Pattern Recognition", Biologically Inspired Cognitive Architectures II: Papers from the AAAI Fall Symposium (FS-09-01), Jan. 2009, pp. 11-15.

(Continued)

*Primary Examiner* — John B Strege
(74) *Attorney, Agent, or Firm* — Behmke Innovation Group LLC; James M. Behmke; Jonathon P. Western

(57) ABSTRACT

In one embodiment, a method includes receiving current data, the current data including time series data representing a plurality of time instances. The method includes storing at least a recent portion of the current data in a buffer. The method includes reducing the dimensionality of the current data to generate dimensionality-reduced data. The method includes generating a reconstruction error based on the dimensionality-reduced data and a plurality of neural network metrics. At least one of a size of the recent portion of the current data stored in the buffer or an amount of the reducing the dimensionality of the current data is based on the reconstruction error.

11 Claims, 5 Drawing Sheets

(51) Int. Cl.
*G06N 3/04* (2006.01)
*G06K 9/00* (2006.01)
*G06K 9/62* (2006.01)

(52) U.S. Cl.
CPC ......... *G06K 9/6273* (2013.01); *G06N 3/0454* (2013.01); *G06N 3/0472* (2013.01); *G06T 7/246* (2017.01); *G06T 2207/10004* (2013.01); *G06T 2207/20084* (2013.01)

(58) Field of Classification Search
CPC ........ G06T 2207/10004; G06K 9/6273; G06K 9/6232; G06K 9/0071
See application file for complete search history.

(56) References Cited

U.S. PATENT DOCUMENTS

| | | | | |
|---|---|---|---|---|
| 6,394,952 | B1* | 5/2002 | Anderson | G01N 21/474 600/300 |
| 2006/0045185 | A1* | 3/2006 | Kiryati | G08B 13/19602 375/240.16 |
| 2014/0325251 | A1* | 10/2014 | Marwah | G06F 1/14 713/500 |
| 2016/0292589 | A1* | 10/2016 | Taylor, Jr. | G06F 16/1744 |
| 2016/0358074 | A1 | 12/2016 | Latapie et al. | |
| 2017/0154262 | A1* | 6/2017 | Sussillo | G06N 3/082 |
| 2017/0372593 | A1* | 12/2017 | Chadwick | G08B 27/00 |
| 2018/0075581 | A1* | 3/2018 | Shi | G06T 3/4053 |
| 2018/0124414 | A1* | 5/2018 | Van Leuven | H04N 19/124 |
| 2018/0130324 | A1* | 5/2018 | Yu | G06K 9/00241 |
| 2018/0144241 | A1* | 5/2018 | Liu | G06N 3/08 |
| 2018/0157918 | A1* | 6/2018 | Levkova | G06K 9/4628 |

OTHER PUBLICATIONS

Dunning, et al., "Practical Machine Learning: A New Look at Anomaly Detection", online: https://mapr.com/practical-machine-learning-new-look-anomaly-detection/assets/practical-machine-learning-new-look-anomaly-detection.pdf, Jun. 2014, 66 pages, O'Reilly Media, Inc.

Low, et al., "Distributed GraphLab: A Framework for Machine Learning and Data Mining in the Cloud", Proceedings of the VLDB Endowment, vol. 5, No. 8, Aug. 2012, pp. 716-727 VLDB Endowment.

* cited by examiner

SCALABLE DEEP LEARNING VIDEO ANALYTICS

CROSS-REFERENCE TO RELATED APPLICATIONS

This application is a divisional of U.S. patent application Ser. No. 15/374,571, filed on Dec. 9, 2016, and hereby incorporated by reference in its entirety.

TECHNICAL FIELD

The present disclosure relates generally to scalable video analytics systems, and in particular, to systems, methods and apparatuses for processing large volumes of video data using a deep learning architecture.

BACKGROUND

The ongoing development, maintenance, and expansion of public environments involve an increasing number of network-enabled video cameras generating an increasing amount of video data of the public environments. Operators of such environments can use this data to identify critical events, from traffic accidents to criminal activities. However, it can be challenging to accurately process video data from a large number of video cameras, particularly in a time-efficient manner so as to identify critical events in real-time.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
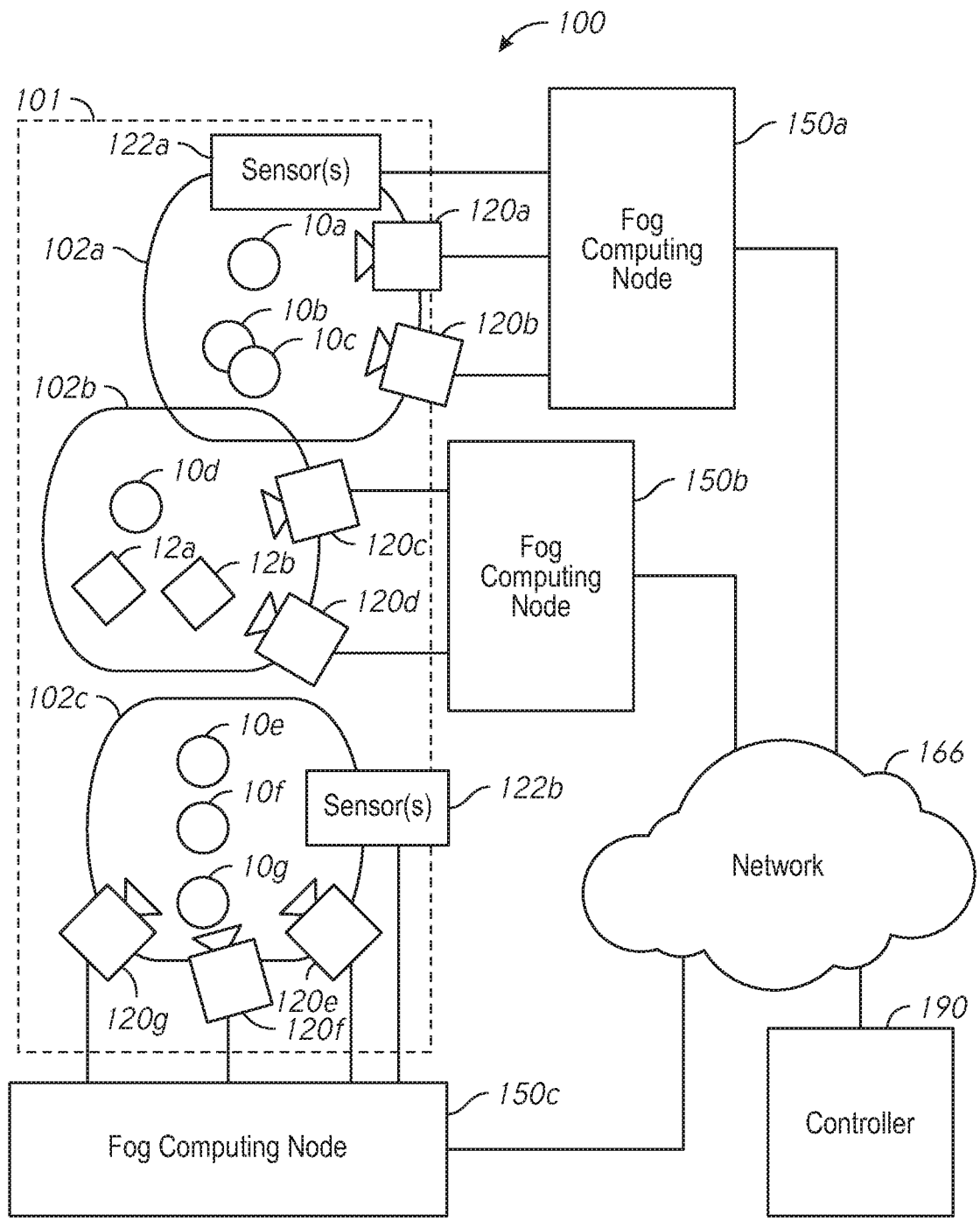
FIG. 1 is a diagram of video analytics system surveying a location in accordance with some implementations

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for processing received data. For example, in some implementations, a method includes receiving training data, the training data including training video data representing video of a location in a quiescent state, training a neural network using the training data to obtain a plurality of metrics, receiving current data, the current data including current video data representing video of the location at a current time period, generating a reconstruction error based on the plurality of metrics and the current video data, and generating, in response to determining that the reconstruction error is greater than a threshold, a notification indicative of the location being in a non-quiescent state.

As another example, in some implementations, a method includes receiving current data, the current data including time series data representing a plurality of time instances, storing at least a recent portion of the current data in a buffer, reducing the dimensionality of the current data to generate dimensionality-reduced data, and generating a reconstruction error based on the dimensionality-reduced data and a plurality of neural network metrics, wherein at least one of a size of the recent portion of the current data stored in the buffer or an amount of the reducing the dimensionality of the current data is based on the reconstruction error.

Example Embodiments

There exists many large-scale deployments of thousands to tens of thousands of video camera in, for example, enterprise, prison system, transportation, and smart city use cases. The large number of cameras produce a large amount of data, a problem which is exacerbated by higher resolution and high frame rate video cameras. The majority of these system lack real-time analytic capabilities as manually processing such a large amount of data is extremely time consuming.

Thus, an automated system for processing such data is beneficial. Accordingly, system and methods described herein can receive, as an input, video data and produce, as an output, a notification that a location is in a non-quiescent state, e.g., that a critical event has occurred, is occurring, or will occur. Such systems and methods can utilize a neural network trained on video data of the location in a quiescent state.

Although automated, processing the large amount of data produced by so many video cameras can, nevertheless, be computationally expensive. Thus, systems and methods described herein can reduce the amount of processing of the data (and/or the amount of data stored) based on the results of applying a trained neural network to current data.

For example, in some embodiments, when a system determines, with a high degree of confidence, that the location is in a quiescent state, the system performs quiescent state processing on lower frame rate and reduced resolution video. The quiescent state processing can include, for example, a class of analytics optimized for the detection of critical events of interest as well as baseline analytics such as zone analytics. This quiescent state processing minimizes the computation, memory, and energy costs that can be orders of magnitude higher during non-quiescent state processing. Accordingly, depending on acceptable latency for critical event detection while in quiescent state processing mode, the system can utilize lower cost cloud computing resources to perform the quiescent state processing.

Conversely, when the system detects a critical event, the system performs non-quiescent processing on higher frame rate and higher resolution video. The non-quiescent state processing can include, for example, computationally intensive crowd and behavioral analytics including multi-camera tracking of key individuals, potential facial recognition, and hyperspectral active tracking of people who intentionally attempt to evade multi-camera tracking via changing outward appearance and motion patterns.

Although, in various implementations, the system operates as a binary classifier with two modes (a quiescent state mode and a non-quiescent state mode), in some embodiments, the system includes more than two modes with various levels of processing depending on the likelihood that a critical event has occurred, is occurring, or will occur. For example, the system can include RBM (restricted Boltzmann machine) stacked auto-encoder trained on training data. When the reconstruction error produced by the auto-encoder is below 5%, the system performs minimal processing on low frame rate and low resolution video data and when the reconstruction error is above 20%, the system performs computationally intensive processing on high frame rate and high resolution video data. Further, in some embodiments, when the reconstruction error is between 5% and 20%, the system performs a middle amount of processing on medium frame rate and medium resolution video data.

FIG. 1 is a diagram of video analytics system 100 surveying a location 101 in accordance with some implementations. The location 101 can include a number of areas 102a-102c which can be at least partially overlapping or independent. Within the areas 102a-102c may be a number of people 10a-10g and other detectable objects 12a-12b, such as vehicles.

Groups of people often gather in public spaces, such as retail environments (e.g., grocery stores, banks, and shopping malls), transportation environments (e.g., bus stops and train stations), living spaces (e.g., apartment buildings or condominium complexes), manufacturing and distribution environments (e.g., factories and warehouses), recreational environments (e.g., city parks and squares), and medical environments (e.g., hospitals, rehabilitation centers, emergency rooms, and doctors' offices). Thus, in various implementations, the location 101 is a city center, an enterprise location, a factory, a prison, a retail establishment, or a transportation hub.

The video analytics system 100 includes one or more video cameras 120a-120g and one or more additional sensors 122a-122b coupled to respective fog computing nodes 150a-150c. The additional sensors 122a-122b can include, for example, parking lot sensors, noise level sensors, air pollution sensors, or WiFi sensors. The video cameras 120a-120g (and/or the sensors 122a-122b) can be coupled to their respective fog computing nodes 150a-150c via a wired or wireless connection. In various implementations, the video cameras 120a-120g (and/or the sensors 122a-122b) are coupled to their respective fog computing nodes 150a-150c via a respective fog network (not shown). The fog network includes, in various implementations, a public or private LAN (local area network). The fog computing nodes 150a-150c are interconnected and connector to a controller 190 via a general network 166. The general network 166 includes any public or private LAN (local area network) and/or WAN (wide area network), such as an intranet, an extranet, a virtual private network, a cable or satellite network, and/or portions of or the entirety of the internet.

Figure 2:
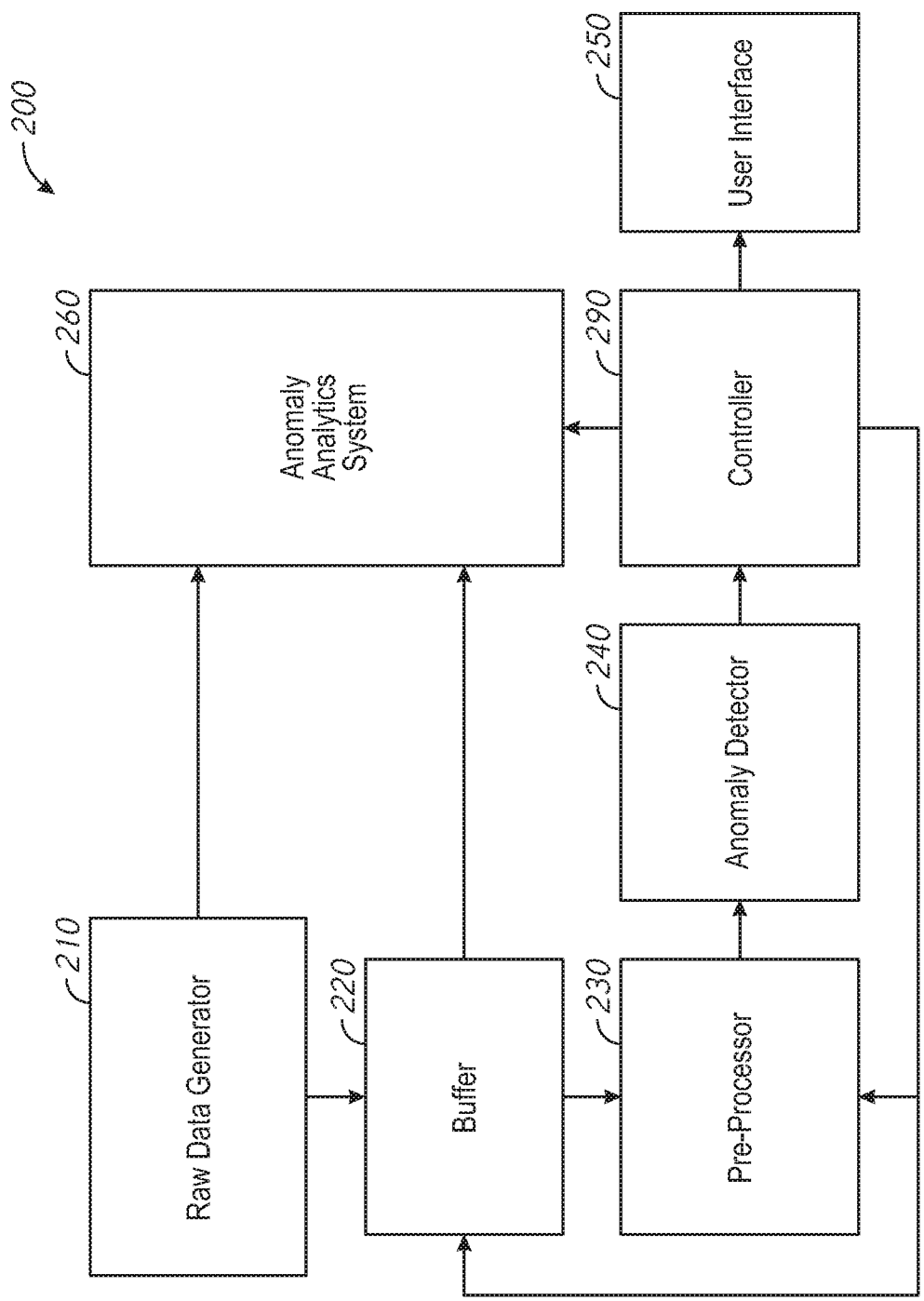
FIG. 2 is a functional block diagram of a video analytics system in accordance with some implementations that can be implemented using the hardware of FIG. 1.

FIG. 2 is a functional block diagram of a video analytics system 200 in accordance with some implementations that can be implemented using the hardware of FIG. 1. Although each of the functional blocks of FIG. 2 are illustrated as a single unit, it is to be appreciated that the functional blocks can be implemented with multiple distributed hardware devices (e.g., hardware devices of the elements illustrated in FIG. 1).

The video analytics system 200 includes a raw data generator 210. The raw data generator 210 generates raw data in the form of multimodal time series data that includes a number of variables for each of a sequence of time instances. The raw data generator 210 can include one or more video cameras surveying various areas of a location (such as the video cameras 120a-120g of FIG. 1). Thus, in various implementations, the raw data generator 210 generates video data of areas of a location. The raw data generator 210 can include one or more additional sensors (such as the sensors 122a-122b of FIG. 1). The additional sensors can include audio sensors (e.g., microphones), and, thus, in various implementations, the raw data generator 210 generates audio data of areas of a location. The additional sensors can include air pollution sensors (e.g., $CO_2$ sensors), and, thus, in various implementations, the raw data generator 210 generates pollution data indicative of the level of pollutants at areas of a location. The additional sensors can include WiFi sensors and, thus, in various implementations, the raw data generator 210 generates WiFi data indicative of a number of users connected to WiFi hotpots located within areas of a location and, in some embodiments, the lengths of those connections. The additional sensors can include social media sensors and, thus, in various implementations, the raw data generator 210 generates social media data indicative of a tone of social media content produced at areas of the location. The social media sensors can retrieve social media content (e.g., tweets or posts) produced at areas of the location (e.g., using geofencing) and perform linguistic analytics to determine an average tone of the social media content. The linguistic analytics can include, for example, searching for (and counting) positive words (e.g., "happy", "awesome", "amazing") and negative words (e.g., "sad", "disappointed", "terrible").

The raw data generated by the raw data generator 210 is fed into a buffer 220. The buffer 220 stores a portion of the raw data. In various implementations, the buffer 220 stores a time period amount of the most recently generated raw data (e.g., the last 5 minutes or the last 10 minutes) received by the buffer 220. In various implementations, as detailed below, the size of the buffer (e.g., the time period amount) can be set by a controller 290. The buffer 220 includes various non-transitory computer readable storage devices. The buffer 220 can include storage devices of the video cameras 120a-120g, the sensors 122a-122b, the fog computing nodes 150a-150c, the controller 190, or other storage systems coupled to the network 166 of FIG. 1.

The raw data generated by the raw data generator 210 and stored in the buffer 220 is fed to a pre-processor 230. The pre-processor 230 reduces the number of variables (e.g., the dimensionality) of the raw data in accordance with instructions from the controller 290. In some embodiments, the pre-processor 230 reduces the frame rate and/or resolution of video data of the raw data. In some embodiments, the pre-processor 230 reduces the sampling rate and/or bit depth of audio data of the raw data. In some embodiments, the pre-processor 230 reduces the sampling rate of pollution data, WiFi data, and/or other data.

In some embodiments, the pre-processor 230 calculates a frame difference between frames of video data of the raw data. The frame difference can be expressed in a number of ways. In some embodiments, the frame difference is a matrix indicating a magnitude of the difference between each pixel in successive frames. In some embodiments, the frame difference is a binary matrix indicating, for each pixel in successive frames, whether the magnitude of the difference exceeds a threshold. In some embodiments, the frame difference is a single value indicating a magnitude of the difference between successive frames. In some embodiments, the frame difference is a binary value indicating whether the magnitude of the difference between successive frames exceeds a threshold.

In some embodiments, the pre-processor 230 performs object tracking analytics of video data of the raw data to generate object tracking data. In some embodiments, the object tracking data includes multimodal time series data that indicates, for each of sequence of time instances, a count of the number of people 10a-10g and/or other objects 12a-12b within each area 102 of the location 101. In some embodiments, the object tracking data includes multimodal time series data that indicates, for each of sequence of time instances, a location of each individual of the people 10a-10g and/or each individual object 12a-12b in each area 102 of the location 101. In a particular example, the tracking information includes one or more trajectory fragments (tracklets) representing a position of a respective one of the plurality of people 10a-10d and/or objects 12a-12b at a plurality of time instances.

In various implementations, the object tracking analytics are implemented as described in U.S. patent application Ser. No. 15/163,833, filed on May 25, 2016, entitled "METHODS AND SYSTEMS FOR COUNTING PEOPLE," and claiming priority to U.S. Provisional Patent App. No. 62/171,700, filed on Jun. 5, 2016. Both of these applications are incorporated by reference herein in their entirety.

In some embodiments, the pre-processor 230 performs facial recognition detection of video data of the raw data to generate facial recognition data indicative of the likelihood of a particular person (or any of set of people) being present at an area of the location.

In some embodiments, the pre-processor 230 performs audio event detection of audio data of the raw data to generate audio event data indicative of the likelihood of a particular event having occurred. For example, in various implementations, the pre-processor 230 includes a gunshot detector that detects whether a gunshot has occurred. As another example, the pre-processor includes a traffic accident detector that detects whether a traffic accident has occurred.

Thus, the pre-processor 230 generates, from the raw data, pre-processed data with a reduced dimensionality, also referred to dimensionality-reduced data. Various components of the video analytics system 100 of FIG. 1 can perform at least a portion of the functionality of the pre-processor 230. For example, in various implementations, one or more of the videos cameras 120a-120g can perform pre-processing of video data of the raw data. As another example, in various implementations, pre-processing of the video data is performed by one or more of the fog computing nodes 150a-150c. Similarly, in various implementations, pre-processing of audio data is performed by audio sensors of the sensors 122a-122b or by one or more of the fog computing nodes 150a-150c. In general, any type of pre-processing can be performed by the video cameras 120a-120g, sensors 122a-122b, fog computing nodes 150a-150c, the controller 190, or any other processing system coupled to the network 166.

The pre-processed data is fed to an anomaly detector 240. The anomaly detector 240 generates a detection value indicative of a distance from a quiescent state of the location. In some embodiments, the detection value is an analog value indicative of an amount the current state of the location differs from a quiescent or normal state. In some embodiments, the detection value is a binary value indicative of an anomaly (e.g., the distance from a quiescent state exceeds a threshold).

In some embodiments, the anomaly detector 240 is implemented as a neural network system. Such a neural network system can includes a number of interconnected layers. Thus, the neural network system can implement a deep learning architecture including multiple processing layers, composed of multiple linear and/or nonlinear transformations. The deep learning architecture can be generative, discriminative, sequential, and/or reinforcement learning based. Each layer can be implemented as neural network to produce outputs based on received inputs. Each neural network includes a plurality of interconnected nodes that instruct the learning process and produce the best output according to a suitable loss function that updates the neural network by back-propagation of the gradient of that said loss function. In various implementations, the loss functions can be any of the typical loss function (hinge loss, least square loss, cross-entropy loss, etc.) or can be a custom loss function that incorporates crowd dynamics behaviors.

In some embodiments, the anomaly detector 240 is implemented by a RBM (restricted Boltzmann machine) stacked auto-encoder. The RBM stacked auto-encoder is trained with raw data (or pre-processed data) generated when the location is in a quiescent state. In some embodiments, the RBM stacked auto-encoder is trained with sparsity constraint on video data and associated analytics such as crowd counts and/or locations (and/or tracklets) of people, vehicles, and other objects of interest. This training data need not be manually annotated or manually processed in any way other than to ensure that no anomalies or critical events are included as part of the training data (e.g., that the training data is generated when the location is in a quiescent state). In some embodiments, in a process referred to as transfer learning, the RBM stacked auto-encoder is initiated using data from similar, previously trained systems. For example, for a new city park environment, the RBM stacked auto-encoded can be initiated using derived metrics from a different city park environment and trained using raw data from the new city park environment. In various implementations, training is complete when the reconstruction error from both the video and the derived metrics are within acceptable bounds and less than a threshold (e.g., 5%).

The trained system is used to process video data and associated analytics using the reconstruction error to flag potential critical events by, in some embodiments, generating a detection value indicative of a distance metric from a quiescent state of the location.

Various components of the video analytics system 100 of FIG. 1 can perform at least a portion of the functionality of the anomaly detector 240. For example, layers of a neural network of the anomaly detector 240 can be implemented by one or more fog computing nodes 150a-150c with additional layers (including an output layer) implemented by the controller 190.

The detection value is fed to a controller 290. The detection value can be used by the controller 290 in a number of ways. For example, in some implementations, the detection value is greater than a threshold (e.g., a reconstruction error is greater than 20%), the controller generates an alert via a user interface 250. The alert can indicate, for example, that an anomaly was detected at the location.

In response to detecting a critical anomalous event of interest at the location, the controller 290 can instruct an anomaly analytics system 260 to perform additional processing of the raw data that associated with the event (e.g., raw data in the buffer 220) and newly generated raw data (e.g., raw data generated by the raw data generator 210). The additional processing may be computationally intensive and can include detailed multi-camera tracking of individuals, facial recognition, and hyperspectral tracking of people who intentionally attempt to evade multi-camera tracking via changing outward appearance and motion patterns.

The detection value can also be used by the controller 290 to change the size of the buffer 220, change the resolution and frame rate of the video data to be processed (in general, the amount of dimensionality reduction performed) by the pre-processor 230, the amount and/or types of processing performed by the video analytics system 200, and/or which computing resources are used to perform the processing. For example, if the detection value is high (and the likelihood of an anomaly is high), the size of the buffer 220 can be increased. Thus, if an anomaly has occurred, sufficient raw data exists in the buffer 220 for post-processing by the anomaly analytics system 260. As another example, if the detection value is high, the amount of dimensionality reduction performed by the pre-processor 230 can be reduced. This increases the amount of computation performed by the anomaly detector 240 only in circumstances when an anomaly is likely to occur, likely to be occurring, and/or likely to occur in the near future. As another example, if the detection value is high, the video analytics system 200 can perform computationally intensive crowd and behavioral analytics.

In contrast, if the detection value is low (and the likelihood of an anomaly is low), the size of the buffer 220 can be decreased. Thus, the storage requirements of the system are not needlessly high. Similarly, if the detection value is low, the amount of dimensionality reduction performed by the pre-processor can be increased. This decreases the amount of computation performed by the anomaly detector 240 in the most common scenario, the lack of an anomaly. As another example, if the detection value is low, processing can be performed by lower cost cloud computing resources.

In various implementations, the controller 290 provides a buffer size value to the buffer 220 indicative of a size of the buffer. The buffer size value can be based on the detection value produced by the anomaly detector 240. For example, the controller 290 can increase the size of the buffer 220 if an anomaly is detected or if the detection value is high. In some embodiments, the buffer size value can be a number of seconds (or minutes, hours, or days) of raw data to store. In some embodiments, the buffer size value can be a binary value indicative of whether the buffer size should be a high value or a low value. In some implementations, the buffer size is proportional to a detection time. For example, if the video analytics system 200 takes approximately one minute to detect an anomaly at the location, the buffer size can be approximately ten minutes. Thus, the buffer 220 includes raw data of the circumstances that led to the anomaly as well as raw data of the anomaly itself.

In various implementations, the controller 290 provides a reduction value to the pre-processor 230 indicative of an amount of dimensionality reduction. The reduction value can be based on the detection value produced by the anomaly detector 240. In various implementations, the controller 290 provides reduction instructions to the pre-processor 230 indicative of particular dimensionality reductions. The reduction instructions can be based on the detection value produced by the anomaly detector 240. For example, the controller 290 can provide specific instructions to change the frame rate of video data, resolution of video data, sampling rate and/or bit depth of audio data of the raw data, sampling rate of pollution data, WiFi data, and/or other data. The controller 290 can provide instructions to perform frame difference calculations and/or object tracking analytics of video data of the raw data to generate tracking information.

Whereas the controller 290 can, e.g., set the size of the buffer 220 or the amount of dimensionality reduction performed by the pre-processor 230 based on the detection value as described above, in some embodiments, the controller 290 can set the size of the buffer 220, the amount of dimensionality reduction performed by the pre-processor 230, the amount of types of processing performed, or the computing resources selected to perform the processing based on manually provided rules. For example, if a facial recognition component of the pre-processor 230 generates facial recognition data indicative that a particular person (or any of set of people) are likely present at an area of the location, a rule may dictate that buffer size be maximized (or at least increased) and dimensionality reduction be minimized (at, at least decreased) irrespective of the detection value produced by the anomaly detector 240. Thus, as a more specific example, if a known criminal is detected in video data at an airport, the video analytics system 200 can increase its storage and processing detecting despite usual crowd traffic patterns.

In some embodiments, a rule indicates that the buffer size and/or the amount of dimensionality reduction should be increased or decreased in reference to the buffer size or the amount of dimensionality reduction based on the detection value. In some embodiments, a rule indicates that the buffer size and/or the amount of dimensionality reduction should be a particular size and/or amount irrespective of the buffer size or amount of dimensionality reduction based on the detection value. In some embodiments, a rule affects a reduction value provided to the pre-processor 230. In some embodiments, a rule affects a reduction instruction provided to the pre-processor 230.

In various implementations, at least a portion of the functionality of the controller 290 is performed by the controller 190 of FIG. 1. In some embodiments, at least a portion of the functionality of the controller 290 is performed by one or more of the fog computing nodes 150a-150c of FIG. 1.

Figure 3:
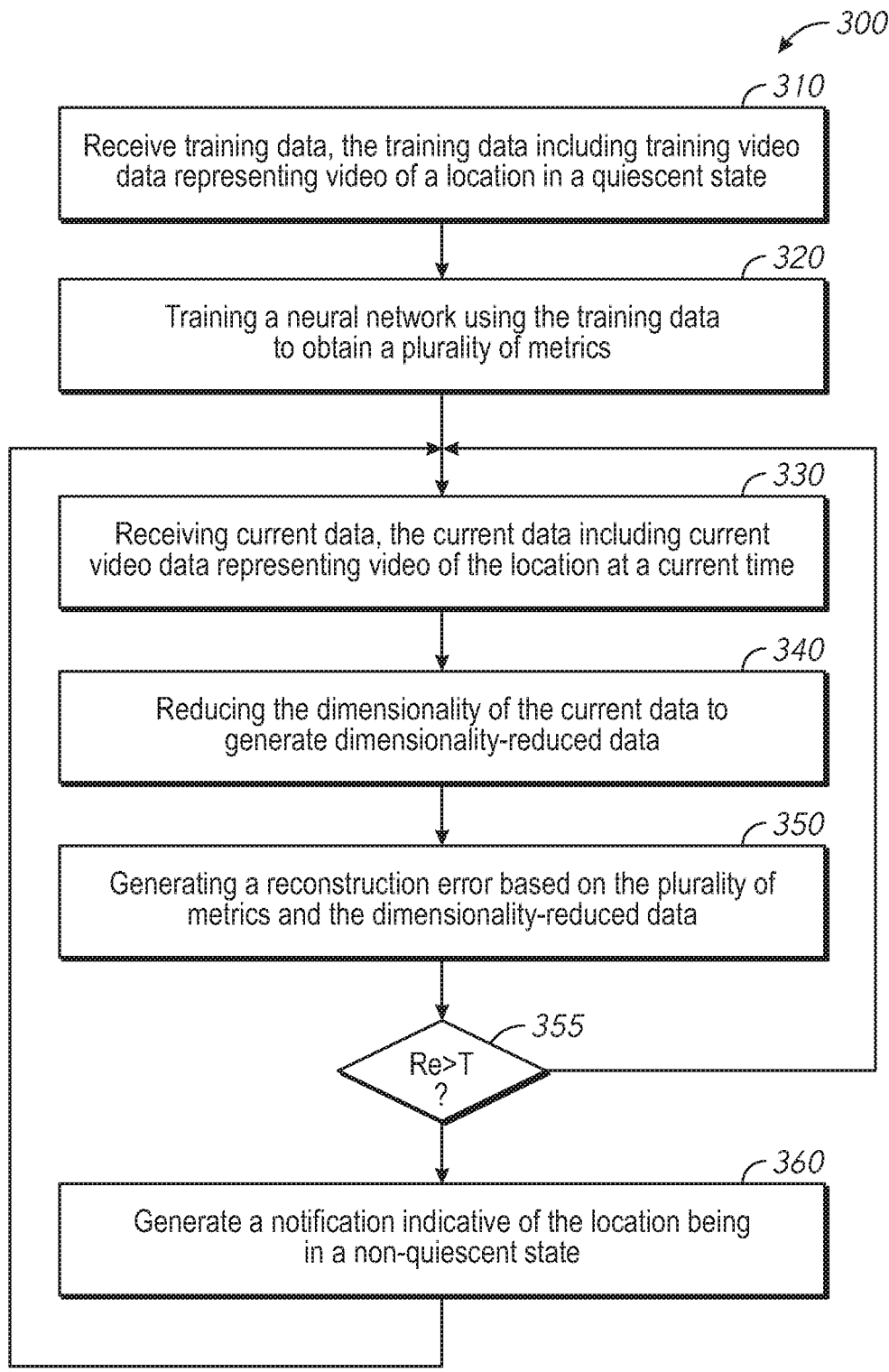
FIG. 3 is a flowchart representation of a method of generating a notification in accordance with some implementations.

FIG. 3 is a flowchart representation of a method 300 of generating a notification in accordance with some implementations. In some implementations (and as detailed below as an example), the method 300 is performed by a video analytics system (or a portion thereof), such as the video analytics system 100 of FIG. 1 or the video analytics system 200 of FIG. 2. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, the method 300 includes training a neural network on training data, applying the neural network to current data, and generating a notification if the reconstruction error is greater than a threshold.

The method 300 begins, at block 310, with the video analytics system receiving training data. The training data can include training video data representing video of a location in quiescent state. In some embodiments, the training data includes training sensor data, such as audio data, pollution data, WiFi data, and/or social media data. The training data can include several days of data recorded by video cameras and/or other sensors surveying a location. The training data need not be manually annotated or manually processed except to ensure that no anomalies or critical events are included as part of the training data (e.g., that the training data is generated when the location is in a quiescent state).

The method 300 continues, at block 320, with the video analytics system training a neural network using the training data to obtain a plurality of metrics. In various implementations, the neural network is a restricted Boltzmann machine stacked auto-encoder. Training may be considered complete when the reconstruction error for the training data and the plurality of metrics are below a threshold (e.g., below 5%) or when the neural network converges to a steady-state (e.g., additional training data does not change the reconstruction error by more than a threshold amount, such as 1%). In some embodiments, the video analytics system 200 initializes the neural network based on a related plurality of metrics obtained by training a neural network using training data from a related location.

The method 300 continues, at block 330, with the video analytics system receiving current data. The current data can include current video data representing video of a location at a current time period. In some embodiments, the current data includes current sensor data, such as audio data, pollution data, WiFi data, and/or social media data. The current data can represent a time period which occurs after a time period represented by the training data.

The method 300 continues, at block 350, with the video analytics system generating a reconstruction error based on the plurality of metrics and the current video data. In various implementations, the video analytics system generates the reconstruction error by applying the current data to the trained neural network. In some embodiments, the method 300 can include setting the size of a buffer storing a recent portion of the current data based on the reconstruction error, setting an amount of dimensionality-reduction of the current data based on the reconstruction error, or selecting a computing resource based on the reconstruction error.

In some embodiments, the video analytics system reducing the dimensionality of the current data to generate dimensionality-reduced data and the reconstruction error is based on the dimensionality-reduced data. In some embodiments, the video analytics system reduces at least one of a frame rate or resolution of the current video data. For example, portions of the current video data can have a frame rate of up to 60 frames per second, and the video analytics system can reduce the frame rate to 30 frames per second, 20 frames per second, 10 frames per second, 5 frames per second, 1 frame per second, or any other value. Similarly, portions of the current video data can have a resolution of up to 200 megapixels per frame, and the video analytics system can reduce the resolution to 100 megapixels per frame, 50 megapixels per frame, 10 megapixels per frame, 5 megapixels per frame, 1 megapixel per frame, or any other value. In some embodiments, the video analytics system generate object tracking data based on the current video data (and replace the current video data with the object tracking data in the dimensionality-reduced data). The object tracking data can include tracklet data representing a position of a respective one of a plurality of objects at a plurality of time instances. The video analytics system can reduce the sampling rate of audio data, pollution data, WiFi data, and/or other sensor data.

In some embodiments, the video analytics system can select a computing resource to utilize based on the reconstruction error. For example, when the location is in a quiescent state, the video analytics system can utilize lower cost cloud computing resources, but when the location is in a non-quiescent state, the video analytics system can utilize faster (and more expensive) computing resources. As another example, the video analytics system can select pre-processing to be performed at a camera (e.g., cameras 120a-120g of FIG. 1) or a fog computing node (e.g., fog computing nodes 150a-150c of FIG. 1) based on the reconstruction error.

The method 300 determines, at block 355, whether the reconstruction error is greater than a threshold. The threshold can be any value, e.g., 20%. If the reconstruction error is not greater than the threshold, the method 300 returns to block 330 where the video analytics system receives more current data. If the reconstruction error is greater than the threshold the method 300 continues to block 360 where the video analytics system generates a notification indicative of the location being in a non-quiescent state. The non-quiescent state can correspond to an anomaly or critical event.

In various implementations, generating the notification can include displaying an indication of an anomaly or critical event via a user interface. In some embodiments, the neural network can classify the critical event and generating the notification can include displaying an indication of the classification and/or a proposed action.

In various implementations, generating the notification includes performing anomaly analytics upon the current data (or the dimensionality-reduced data). The anomaly analytics can include detailed multi-camera tracking of individuals, facial recognition, and/or hyperspectral tracking of people who intentionally attempt to evade multi-camera tracking via changing outward appearance and motion patterns.

From block 360, the method 300 returns to block 330 where the video analytics system receives more current data.

Figure 4:
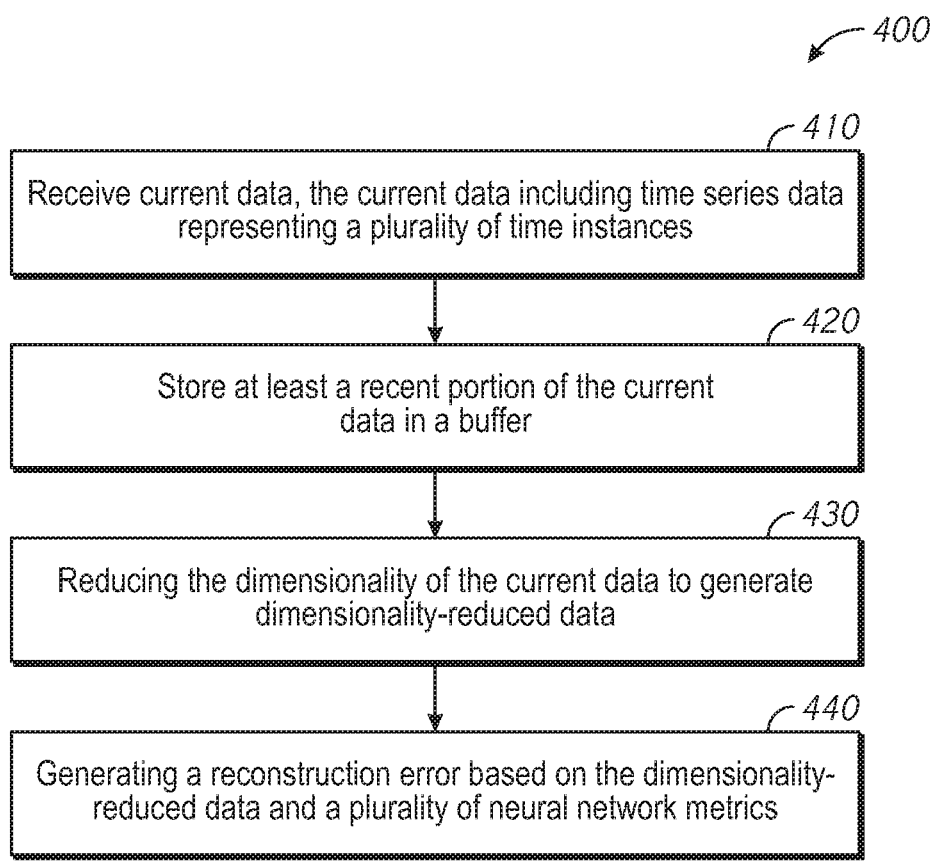
FIG. 4 is a flowchart representation of a method of generating a reconstruction error in accordance with some implementations.

FIG. 4 is a flowchart representation of a method 400 of generating a reconstruction error in accordance with some implementations. In some implementations, the method 400 is performed by a video analytics system (or a portion thereof), such as the video analytics system 100 of FIG. 1 or the video analytics system 200 of FIG. 2. Although the description above has used video data processing as an example of data processing, many features described herein can be applied to other data processing environments and can be performed (as described below as an example) by a data processing system. In some implementations, the method 400 is performed by processing logic, including hardware, firmware, software, or a combination thereof. In some implementations, the method 300 is performed by a processor executing code stored in a non-transitory computer-readable medium (e.g., a memory). Briefly, the method 400 includes applying a neural network to an amount of data based on reconstruction error of a neural network.

The method 400 begins, at block 410, with the data processing system receiving current data. The current data includes time series data representing a plurality of time instances. For each time instance, the time series data can include an image. Thus, the current data can include video data. Accordingly, in some embodiments, the time series data includes current video data representing video of a location at a current time period. For each time instance, the time series data can include a sensor reading. Thus, the current data can include sensor data. Accordingly, the time series data can include current sensor data including at least one of audio data, pollution data, WiFi data, or social media data. For each time instance, the time series data can include other data.

The method continues, at block 420, with the data processing system storing at least a recent portion of the current data in a buffer. In various implementations, the data processing system stores, in the buffer, a time period amount of the most recently generated current data (e.g., the last 5 minutes or the last 10 minutes).

The method continues, at block 430, with the data processing system reducing the dimensionality of the current data to generate dimensionality-reduced data. In some embodiments, the data processing system reduces at least one of a frame rate or resolution of video data of the current data. In some embodiments, the data processing system generate object tracking data based on video data of the current data (and replaces the current video data with the object tracking data in the dimensionality-reduced data). The data processing system can reduce the sampling rate of audio data, pollution data, WiFi data, and/or other sensor data of the current data.

The method continues, at block 440, with the data processing system generating a reconstruction error based on the dimensionality-reduced data and a plurality of neural network metrics. In various implementations, the data processing system generates the reconstruction error by applying the current data to a trained neural network. In various implementations, a size of the recent portion of the current data stored in the buffer is based on the reconstruction error. In various implementations, an amount of the reducing the dimensionality of the current data is based on the reconstruction error.

Figure 5:
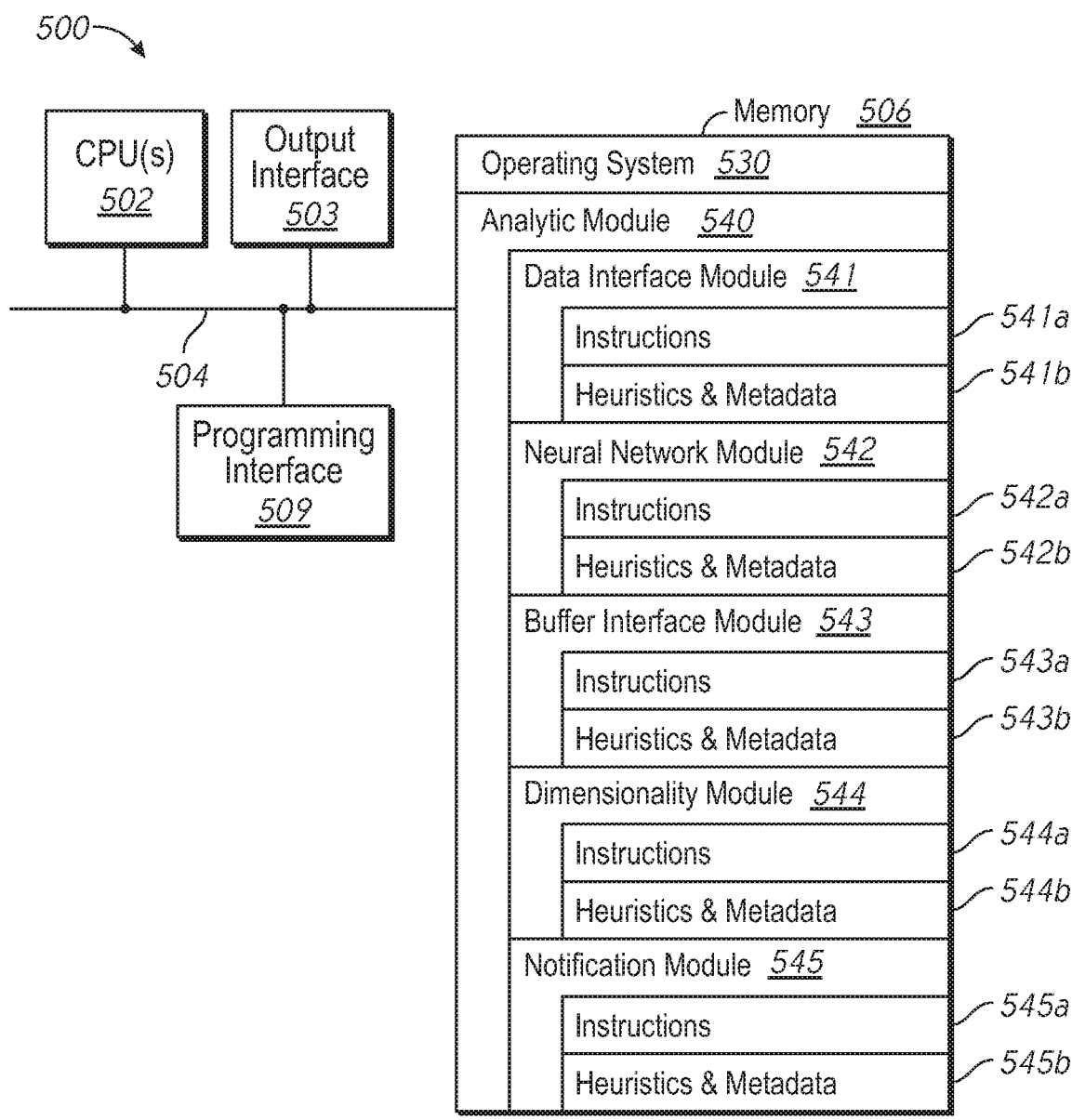
FIG. 5 is a block diagram of a computing device in accordance with some implementations.

FIG. 5 is a block diagram of a computing device 500 in accordance with some implementations. In some implementations, the computing device 500 corresponds to the at least a portion of the video analytics system 100 of FIG. 1 or the video analytics system 200 of FIG. 2 and performs one or more of the functionalities described above with respect to the video analytics systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 500 includes one or more processing units (CPU's) 502 (e.g., processors), one or more input/output interfaces 503 (e.g., a network interface and/or a sensor interface), a memory 506, a programming interface 509, and one or more communication buses 504 for interconnecting these and various other components.

In some implementations, the communication buses 504 include circuitry that interconnects and controls communications between system components. The memory 506 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506 comprises a non-transitory computer readable storage medium. Moreover, in some implementations, the memory 506 or the non-transitory computer readable storage medium of the memory 506 stores the following programs, modules and data structures, or a subset thereof including an optional operating system 530 and analytic module 540. In some implementations, one or more instructions are included in a combination of logic and non-transitory memory. The operating system 530 includes procedures for handling various basic system services and for performing hardware dependent tasks. In some implementations, the analytic module 540 is configured to generate one or more behavioral analytic metrics and provide notifications based on the metrics. To that end, the analytic module 540 includes a data interface module 541, a neural network module 542, a buffer interface module 543, a dimensionality module 544, and a notification module 545.

In some implementations, the data interface module 541 is configured to receive training data, the training data including training video data representing video of a location in a quiescent state. To that end, the data interface module 541 includes a set of instructions 541a and heuristics and metadata 541b. In some implementations, the neural network module 542 is configured to train a neural network using the training data to obtain a plurality of metrics. To that end, the neural network module 542 includes a set of instructions 542a and heuristics and metadata 542b. In some implementations, the data interface module 541 is further configured to receive current data, the current data including current video data representing video of the location at a current time period. In some implementations, the dimensionality module 544 is configured to reduce the dimensionality of the current data to generate dimensionality-reduced data. To that end, the dimensionality module 433 includes a set of instructions 544a and heuristics and metadata 544b. In some implementations, the neural network module 542 is further configured to generate a reconstruction error based on the plurality of metrics and the dimensionality-reduced data. In some implementations, the notification module 545 is configured to generate, in response to determining that the reconstruction error is greater than a threshold, a notification indicative of the location being in a non-quiescent state. To that end, the notification module 545 includes a set of instructions 545a and heuristics and metadata 545b.

In some implementations, the data interface module 541 is configured to receive current data, the current data including time series data representing a plurality of time instances. In some implementations, the buffer interface module 543 is configured to store at least a recent portion of the current data in a buffer. To that end, the buffer interface module 543 includes a set of instructions 543a and heuristics and metadata 545b. In some implementations, the dimensionality module 544 is configured to reduce the dimensionality of the current data to generate dimensionality-reduced data. In some implementations, the neural network module 542 is configured to generate a reconstruction error based on the dimensionality-reduced data and a plurality of neural network metrics, wherein at least one of a size of the recent portion of the current data stored in the buffer or an amount of the reducing the dimensionality of the current data is based on the reconstruction error.

Although the analytic module 540, the data interface module 541, the neural network module 542, the buffer interface module 543, the dimensionality module 544, and the notification module 545 are illustrated as residing on a single computing device 500, it should be understood that in other embodiments, any combination of the analytic module 540, the data interface module 541, the neural network module 542, the buffer interface module 543, the dimensionality module 544, and the notification module 545 can reside in separate computing devices in various implementations. For example, in some implementations each of the analytic module 540, the data interface module 541, the neural network module 542, the buffer interface module 543, the dimensionality module 544, and the notification module 545 reside on a separate computing device or in the cloud.

Moreover, FIG. 5 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GPGPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
receiving current data, the current data including time series data representing a plurality of time instances;
storing at least a recent portion of the current data in a buffer;
reducing the dimensionality of the current data in the buffer to generate dimensionality-reduced data; and
generating a reconstruction error based on the current data and a plurality of neural network metrics, wherein at least one of a size of the recent portion of the current data stored in the buffer and an amount of the reducing the dimensionality of the current data is based on the reconstruction error,
wherein the time series data includes current video data representing video of a location at a current time period, and the reducing of the dimensionality of the current data includes generating object tracking data based on the current video data.

2. The method of claim 1, wherein reducing the dimensionality of the current data includes reducing at least one of a frame rate or resolution of the current video data.

3. The method of claim 1, wherein the object tracking data includes tracking data representing a position of a respective one of a plurality of objects at a plurality of time instances.

4. The method of claim 1, wherein the time series data includes current sensor data including at least one of audio data, pollution data, WiFi data, or social media data.

5. The method of claim 4, wherein reducing the dimensionality of the current data includes reducing the sampling rate of the current sensor data.

6. A system comprising:
one or more processors; and
a non-transitory memory comprising instructions that when executed cause the one or more processors to perform operations comprising:
receiving current data, the current data including time series data representing a plurality of time instances;
storing at least a recent portion of the current data in a buffer;
reducing the dimensionality of the current data in the buffer to generate dimensionality-reduced data; and
generating a reconstruction error based on the current data and a plurality of neural network metrics, wherein at least one of a size of the recent portion of the current data stored in the buffer and an amount of the reducing the dimensionality of the current data is based on the reconstruction error, wherein the time series data includes current video data representing video of a location at a current time period, and the reducing of the dimensionality of the current data includes generating object tracking data based on the current video data.

7. The system of claim 6, wherein reducing the dimensionality of the current data includes reducing at least one of a frame rate or resolution of the current video data.

8. The system of claim 6, wherein the object tracking data includes tracking data representing a position of a respective one of a plurality of objects at a plurality of time instances.

9. The system of claim 6, wherein the time series data includes current sensor data including at least one of audio data, pollution data, WiFi data, or social media data.

10. The system of claim 9, wherein reducing the dimensionality of the current data includes reducing the sampling rate of the current sensor data.

11. A method comprising:
receiving current data, the current data including time series data representing a plurality of time instances;
storing at least a recent portion of the current data in a buffer;
reducing the dimensionality of the current data in the buffer to generate dimensionality-reduced data;
generating a reconstruction error based on the current data and a plurality of neural network metrics, wherein at least one of a size of the recent portion of the current data stored in the buffer and an amount of the reducing the dimensionality of the current data is based on the reconstruction error,
wherein the time series data includes current sensor data including at least one of audio data, pollution data, WiFi data, and social media data, and the reducing of the dimensionality of the current data includes reducing the sampling rate of the current sensor data.

* * * * *